United States Patent
Walton et al.

(10) Patent No.: US 7,338,994 B2
(45) Date of Patent: *Mar. 4, 2008

(54) RHEOLOGY-MODIFIED THERMOPLASTIC ELASTOMER COMPOSITIONS FOR EXTRUDED PROFILES

(75) Inventors: Kim Louis Walton, Lake Jackson, TX (US); Laura Bauerle Weaver, Hudson, OH (US)

(73) Assignee: Dow Global Technologies Inc., Midland, MI (US)

( * ) Notice: Subject to any disclaimer, the term of this patent is extended or adjusted under 35 U.S.C. 154(b) by 129 days.

This patent is subject to a terminal disclaimer.

(21) Appl. No.: 10/674,311

(22) Filed: Sep. 30, 2003

(65) Prior Publication Data

US 2004/0127628 A1 Jul. 1, 2004

Related U.S. Application Data

(60) Provisional application No. 60/415,175, filed on Oct. 1, 2002.

(51) Int. Cl.
*C08K 5/15* (2006.01)

(52) U.S. Cl. ............ 524/114; 524/401; 524/524; 525/240

(58) Field of Classification Search ........... 524/114, 524/401, 524; 525/240, 241
See application file for complete search history.

(56) References Cited

U.S. PATENT DOCUMENTS

| | | | |
|---|---|---|---|
| 3,758,643 A | 9/1973 | Fischer | |
| 3,806,558 A | 4/1974 | Fischer | |
| 3,862,106 A | 1/1975 | Fischer | |
| 3,957,919 A | 5/1976 | Von Bodungen et al. | |
| 4,247,652 A | 1/1981 | Matsuda et al. | |
| 4,375,531 A | 3/1983 | Ross | |
| 4,379,888 A | 4/1983 | Yoshimura et al. | |
| 4,525,257 A | 6/1985 | Kurtz et al. | |
| 4,535,125 A | 8/1985 | McCullough, Jr. | |
| 4,861,834 A | 8/1989 | Audureau et al. | |
| 4,985,502 A | 1/1991 | Izumi et al. | |
| 5,218,046 A | 6/1993 | Audureau et al. | |
| 5,290,886 A | 3/1994 | Ellul | |
| 5,308,699 A | 5/1994 | Hikasa et al. | |
| 5,308,700 A | 5/1994 | Hikasa et al. | |
| 5,334,663 A | 8/1994 | Audureau et al. | |
| 5,338,801 A | 8/1994 | Eppert | |
| 5,384,366 A | 1/1995 | Paganelli | |
| 5,407,971 A | 4/1995 | Everaerts et al. | |
| 5,525,675 A | 6/1996 | Masuda et al. | |
| 5,639,818 A | 6/1997 | Lee et al. | |
| 5,650,468 A | 7/1997 | Vandevijver et al. | |
| 5,656,691 A | 8/1997 | Niki et al. | |
| 5,702,827 A | 12/1997 | Itoh et al. | |
| 5,728,744 A | 3/1998 | Okada et al. | |
| 5,750,263 A | 5/1998 | Ngoc et al. | |
| 5,750,600 A | 5/1998 | Nozokido et al. | |
| 5,753,772 A | 5/1998 | Laurich et al. | |
| 5,763,532 A | 6/1998 | Harrington et al. | |
| 5,786,403 A | 7/1998 | Okada et al. | |
| 5,837,787 A | 11/1998 | Harrington | |
| 5,847,052 A | 12/1998 | Hamanaka et al. | |
| 5,852,100 A | 12/1998 | Sadatoshi et al. | |
| 5,929,127 A | 7/1999 | Raetzsch et al. | |
| 5,952,396 A | 9/1999 | Chang | |
| 6,020,046 A | 2/2000 | Abhau | |
| 6,087,431 A | 7/2000 | Uchida et al. | |
| 6,114,486 A | 9/2000 | Rowland et al. | |
| 6,143,829 A | 11/2000 | Babb et al. | |
| 6,207,746 B1 | 3/2001 | Uchida et al. | |
| 6,465,574 B1 | 10/2002 | Mulas et al. | |
| 6,506,842 B1 | 1/2003 | Heck et al. | |
| 6,548,600 B2 * | 4/2003 | Walton .................. 525/191 |
| 6,610,785 B1 * | 8/2003 | Cecchin et al. ............ 525/191 |
| 6,765,058 B1 | 7/2004 | Novits et al. | |
| 6,774,186 B2 * | 8/2004 | Walton .................. 525/191 |
| 2002/0082328 A1 | 6/2002 | Yu et al. | |
| 2005/0176892 A1 | 8/2005 | Weaver et al. | |

FOREIGN PATENT DOCUMENTS

| | | |
|---|---|---|
| EP | 0312664 A1 | 4/1989 |
| EP | 0329288 A2 | 8/1989 |
| EP | 0672712 A | 9/1995 |
| EP | 0838497 A1 | 4/1998 |
| EP | 0872517 A | 10/1998 |
| GB | 1192189 | 5/1970 |
| WO | WO-98/21275 | 5/1998 |
| WO | WO-98/32795 | 7/1998 |
| WO | WO-98/54260 | 12/1998 |
| WO | WO 0224803 A | 3/2002 |
| WO | WO-2005-056670 A1 | 6/2005 |

* cited by examiner

Primary Examiner—Peter D. Mulcahy

(57) ABSTRACT

Rheology-modified, gel-free thermoplastic elastomer compositions comprising a melt blend of an ethylene/α-olefin polymer and a high melting polymer such as polypropylene or a propylene/α-olefin copolymer wherein the rheology modification is induced by a combination of a peroxide and a free radical coagent in a peroxide:coagent ratio of 1:4 to 1:20 and a maximum peroxide concentration of 0.075 wt %. The resulting compositions have an elastomeric phase, a non-elastomeric phase and certain physical properties that exceed those of a like composition that is rheology-modified by peroxide alone or peroxide and coagent in a 1:2 to 2:1 ratio. The compositions are used to make a variety of articles of manufacture, such as tubing and weatherstripping, via calendaring, extrusion, and molding techniques such as blow molding.

30 Claims, No Drawings

RHEOLOGY-MODIFIED THERMOPLASTIC ELASTOMER COMPOSITIONS FOR EXTRUDED PROFILES

CROSS-REFERENCE TO RELATED APPLICATIONS

This application claims the benefit of U.S. Provisional Application No. 60/415,175 filed Oct. 1, 2002.

FIELD OF THE INVENTION

This invention relates generally to rheology-modified thermoplastic elastomer (TPE) compositions that comprise an elastomeric ethylene/alpha ($\alpha$)-olefin (EAO) polymer or EAO polymer blend and a high melting propylene polymer, wherein both components are peroxide-modified and to the preparation of the compositions, use of such compositions in processes such as film, sheet, and profile extrusion, blow molding, calendaring, injection molding, and thermoforming operations to make articles of manufacture and the resulting articles of manufacture. This invention particularly relates to such compositions wherein the rheology modification is induced by a specific combination comprising low levels of organic peroxide and high level of a free radical coagent in very specific ratios, methods for preparing the compositions, such as by modifying a physical blend of the components, and use of such compositions in extrusion, molding, calendaring, and thermoforming operations.

BACKGROUND OF THE INVENTION

Heck et al. describe rheology modified TPE compositions in WO 98/32795. The rheology modification can be induced by various means including peroxides and radiation. The compositions of Heck et al. are said to exhibit a combination of four properties: shear thinning index (STI), melt strength (MS), solidification temperature (ST) and upper service temperature (UST). Heck et al. rheology modifies the compositions using a peroxide alone. Heck et al. teach that the polymer compositions must have an STI of at least 20, preferably at least 25, more preferably at least 30, and still more preferably at least 35. While these compositions may be useful in some applications such as automotive parts and boot shafts, improved compositions are needed for extrusion, molding, and calendaring operations, especially high speed operations.

Walton describes in WO 02/24803 rheology modified compositions for calendaring and thermoforming operations. The compositions are described broadly as comprising a peroxide and coagent in a 1:10 to 10:1 ratio, although in the examples, rheology modification is accomplished by use of a peroxide and coagent in an approximately 1:2 to 2:1 ratio. (One skilled in the art understands that ratios are defined using whole numbers only.) The rheology modified compositions of Walton exhibit a melt toughness of at least about 600 cN•mm/s, a true ultimate tensile strength at 140° C. of at least about 3 MPa and an elongation to break at 140° C. of at least about 400%. The Walton compositions can also have measureable gels which are undesirable for many extrusion and other molding processes. While these compositions may be useful for some calendaring operations, improved compositions are needed for extrusion, molding, and calendaring operations where a smooth surface, low odor, collapse resistance, and high productions line speeds are desired.

Compositions having a smooth surface are desirable for extrusion, molding and calendaring. Shape retention or collapse resistance is particularly important for profile extrusion. Compositions having low odor are desired for all operations, including extrusion, molding and calendaring, and those which are capable of being extruded at high line speeds are especially desirable for extrusion and blow molding operations. A smooth surface is aesthetically pleasing and sometimes required to obtain good sealing properties, shape retention is needed to prevent collapse of the extruded profile after exiting the die, and low odor is desirable to minimize worker exposure to chemical residuals during the manufacturing process. High line speeds translate into improved productivity for the manufacturer.

Surprisingly, it has been discovered that by rheology modifying TPE compositions with low levels of peroxide and high levels of coagent, relative to peroxide levels, compositions are produced which can be extruded at very high line speeds and provide articles with excellent surface and odor characteristics.

SUMMARY OF THE INVENTION

Applicant has found that rheology modification by addition of at least one peroxide and at least one free radical coagent in a specific ratio has a significant effect on the extrudability and surface properties of blends of at least one elastomeric EAO polymer or EAO polymer blend and a polyolefin such as PP. Extruded, molded, and calendered articles manufactured from the rheology modified compositions of this invention have improved surface properties, even at significiently higher production rates than corresponding compositions rheology modified by the addition of peroxides or peroxides and coagents at 1:2 to 2:1 ratios. As such, one aspect of this invention is a rheology-modified, gel-free TPE composition comprising an EAO polymer or EAO polymer blend and a high melting polymer selected from the group consisting of polypropylene homopolymers and propylene/ethylene copolymers, wherein the composition is rheology modified by at least one peroxide at a concentration between 0.005 and 0.075 wt % based on TPE composition, and at least one free radical coagent in a peroxide to coagent ratio of at least 1:4, the rheology modified composition having a tan delta @190° C. of between 1.05 and 1.40 and an STI of between 15 and 30 including the end points. Compounds prepared from the rheology modified polymers of this invention can be extruded at higher line speeds to produce a profile having a much smoother surface than profiles prepared from the same polymers, but rheology modified by peroxide alone or by peroxide and a coagent at a 1:2 to 2:1 ratio.

A second aspect of this invention is a process for preparing a rheology-modified, gel-free TPE composition, the process comprising: a) adding at least one peroxide and at least one free radical coagent in a peroxide:coagent ratio of at least 1:4 to a molten polymer blend that comprises an elastomeric ethylene/alpha-olefin polymer and a high melting polymer selected from the group consisting of polypropylene homopolymers and propylene/ethylene copolymers; and b) maintaining the polymer blend in a molten state while subjecting it to conditions of shear sufficient to disperse the peroxide and coagent throughout the molten polymer blend and effect rheology modification of the polymers, sufficient rheology modification being measured by an STI of 15-30, a tan delta of 1.05-1.40 and no measureable gels for the TPE composition. The process optionally includes a step c) wherein the rheology modified polymer blend is converted to an article of manufacture, preferably without intermediate steps of recovering the rheology modified polymer blend as a solid and then converting the solid to a melt state sufficient for fabricating the article of manufacture. If desired, however, the process optionally includes the intermediate steps.

One variation of the second aspect is a process for preparing a rheology-modified, gel-free TPE composition, the process comprising: a) adding at least one peroxide and at least one free radical coagent in a peroxide:coagent ratio of at least 1:4 to at least one component polymer of a polymer blend, before the components are blended, the component polymers comprising an elastomeric ethylene/alpha-olefin polymer and a high melting polymer selected from the group consisting of polypropylene homopolymers and propylene/ethylene copolymers; b) blending the component polymers; and c) converting the polymer blend to a molten polymer blend while subjecting the blend to conditions of shear sufficient to disperse the peroxide and coagent throughout the molten polymer blend, effect rheology modification of the polymers, sufficient rheology modification being measured by an STI of 15-30, a tan delta of 1.05-1.40 for the TPE compositon and no measureable gels. The process optionally includes a sequential step c) wherein the rheology modified polymer blend is converted to an article of manufacture, preferably without intermediate steps of recovering the rheology modified polymer blend as a solid and then converting the solid to a melt state sufficient for fabricating the article of manufacture. If desired, however, the process optionally includes the intermediate steps.

A second variation of the second aspect is a process for preparing a rheology-modified, gel-free thermoplastic elastomer article of manufacture, the process comprising: a) adding at least one peroxide and at least one free radical coagent in a peroxide:coagent ratio of at least 1:4 to a molten elastomeric ethylene/alpha-olefin polymer or molten elastomeric ethylene/alpha-olefin polymer blend to provide a rheology-modified ethylene/alpha-olefin polymer or rheology-modified ethylene/alpha-olefin polymer blend; b) adding to the rheology-modified polymer or polymer blend a high melting polymer selected from the group consisting of polypropylene homopolymers and propylene/ethylene copolymers to form a composite polymer blend; and c) converting the composite polymer blend into the article of manufacture, the article of manufacture having a smooth surface when extruded, molded, or calendered.

A third aspect of this invention is an article of manufacture having at least one component thereof fabricated from the TPE composition of the invention. The compositions readily allow formation of articles of manufacture using apparatus for extrusion and/or calendaring. In a related aspect, the TPE compositions of the invention are blended with another polymer, preferably one of the polymers used to make the TPE composition, prior to fabrication of an article of manufacture.

DESCRIPTION OF PREFERRED EMBODIMENTS

The rheology-modified compositions of this invention comprise an elastomeric EAO polymer or EAO polymer blend and a high melting polymer. The compositions desirably contain the EAO polymer or EAO polymer blend in an amount of from about 60 to about 90 wt % and the high melting polymer(s) in an amount of from about 40 to about 10 wt %, both percentages being based on composition weight. The amounts are chosen to total 100 wt % polymer.

For purposes of this invention, rheology-modified means a composition having an STI of 15-30, and a tan delta of @190° C. 1.05-1.40.

EAO polymers (also referred to as "ethylene polymers") that are suitable for this invention include interpolymers and diene modified interpolymers. Illustrative polymers include ethylene/propylene (EP) copolymers, ethylene/butylene (EB) copolymers, ethylene/octene (EO) copolymers and ethylene/propylene/diene modified (EPDM) interpolymers. More specific examples include ultra low linear density polyethylene (ULDPE) (e.g., Aftane™ made by The Dow Chemical Company), homogeneously branched, linear EAO copolymers (e.g. Tafmer™ by Mitsui PetroChemicals Company Limited and Exact™ by Exxon Chemical Company), and homogeneously branched, substantially linear EAO polymers (e.g. the Affinity™ polymers available from The Dow Chemical Company and Engage® polymers available from DuPont Dow Elastomers L.L.C. The more preferred EAO polymers are the homogeneously branched linear and substantially linear ethylene copolymers with a density (measured in accordance with ASTM D-792) of from about 0.85 to about 0.92 g/cm$^3$, especially from about 0.85 to about 0.90 g/cm$^3$ and a melt index or $I_2$ (measured in accordance with ASTM D-1238 (190° C./2.16 kg weight) of from about 0.01 to about 30, preferably 0.05 to 10 g/10 min.

The substantially linear ethylene copolymers or interpolymers (also known as "SLEPs") are especially preferred. In addition, the various functionalized ethylene copolymers such as EVA (containing from about 0.5 to about 50 wt % units derived from vinyl acetate) are also suitable. When using an EVA polymer, those that have an $I_2$ of from about 0.01 to about 500, preferably 0.05 to 50 g/10 min are preferred.

"Substantially linear" means that a polymer has a backbone substituted with from 0.01 to 3 long-chain branches per 1000 carbons in the backbone.

"Long-chain branching" or "LCB" means a chain length that exceeds that of the alpha-olefin component of the EAO polymer or EAO polymer blends. Although carbon-13 nuclear magnetic resonance (C-13 NMR) spectroscopy cannot distinguish or determine an actual number of carbon atoms in the chain if the length is greater than six carbon atoms, the presence of LCB can be determined, or at least estimated, from molecular weight distribution of the EAO polymer(s). It can also be determined from a melt flow ratio (MFR) or ratio ($I_{10}/I_2$) of melt index ($I_{10}$) via ASTM D-1238 (190° C., 10 kg weight) to $I_2$.

"Interpolymer" refers to a polymer having polymerized therein at least two monomers. It includes, for example, copolymers, terpolymers and tetrapolymers. It particularly includes a polymer prepared by polymerizing ethylene with at least one comonomer, typically an α-olefin of 3 to 20 carbon atoms ($C_3$-$C_{20}$). Illustrative α-olefins include propylene, 1-butene, 1-hexene, 4-methyl-1-pentene, 1-heptene, 1-octene and styrene. The α-olefin is desirably a $C_3$-$C_{10}$ α-olefin. Preferred copolymers include EP, EB, ethylene/hexene-1 (EH) and EO polymers. Illustrative terpolymers include an ethylene/propylene/octene terpolymer as well as terpolymers of ethylene, a $C_3$-$C_{20}$ α-olefin and a diene such as norbornadiene, dicyclopentadiene, 1,4-hexadiene, piperylene or 5-ethylidene-2-norbornene.

"Elastomeric", as used herein, means an EAO polymer or EAO polymer blend that has a density that is beneficially less than about 0.920 g/cc, desirably less than about 0.900 g/cc, preferably less than about 0.895 g/cc, more preferably less than about 0.880 g/cc, still more preferably less than about 0.875 g/cc, even more preferably less than about 0.870 g/cc and a percent crystallinity of less than about 33%, preferably less than about 29% and more preferably less than about 23%. The density is preferably greater than about 0.850 g/cc. Percent crystallinity is determined by differential scanning calorimetry (DSC).

SLEPs are characterized by narrow molecular weight distribution (MWD) and narrow short chain branching distribution (SCBD) and may be prepared as described in U.S. Pat. Nos. 5,272,236 and 5,278,272, relevant portions of both being incorporated herein by reference. The SLEPs exhibit outstanding physical properties by virtue of their narrow MWD and narrow SCBD coupled with long chain branching (LCB).

U.S. Pat. No. 5,272,236 (column 5, line 67 through column 6, line 28) describes SLEP production via a continuous controlled polymerization process using at least one reactor, but allows for multiple reactors, at a polymerization temperature and pressure sufficient to produce a SLEP having desired properties. Polymerization preferably occurs via a solution polymerization process at a temperature of from 20° C. to 250° C., using constrained geometry catalyst technology. Suitable constrained geometry catalysts are disclosed at column 6, line 29 through column 13, line 50 of U.S. Pat. No. 5,272,236.

A preferred SLEP has a number of distinct characteristics, one of which is an ethylene content that is between 20 and 90 wt %, more preferably between 30 and 89 wt %, with the balance comprising one or more comonomers. The ethylene and comonomer contents are based on SLEP weight and selected to attain a total monomer content of 100 wt %. For chain lengths up to six carbon atoms, SLEP comonomer content can be measured using C-13 NMR spectroscopy.

Additional distinct SLEP characteristics include $I_2$ and MFR or $I_{10}/I_2$. The interpolymers desirably have an $I_2$ of 0.01-30 g/10 min, more preferably from 0.05-10 g/10 min. The SLEP also has a $I_{10}/I_2$ (ASTM D-1238)$\geq$5.63, preferably from 6.5 to 15, more preferably from 7 to 10. For a SLEP, the $I_{10}/I_2$ ratio serves as an indication of the degree of LCB such that a larger $I_{10}/I_2$ ratio equates to a higher degree of LCB in the polymer.

SLEPs that meet the aforementioned criteria include, for example, Engage® polyolefin elastomers from DuPont Dow Elastomers L.L.C. and other polymers produced via constrained geometry catalysis by The Dow Chemical Company and DuPont Dow Elastomers L.L.C.

The high melting polymer component of the TPEs of this invention is a homopolymer of propylene or a copolymer of propylene with an α-olefin such as ethylene, 1-butene, 1-hexene or 4-methyl-1-pentene or a blend of a homopolymer and a copolymer. Each of the homopolymer, the copolymer or the blend of a homopolymer and a copolymer may be nucleated. The α-olefin is preferably ethylene. The copolymer may be a random copolymer or a block copolymer or a blend of a random copolymer and a block copolymer. As such, this component is preferably selected from the group consisting of polypropylene (PP) homopolymers and propylene/ethylene copolymers. This component has a MFR of 0.3 to 60 g/10 min, preferably 0.8 to 40 g/10 min and more preferably 1 to 35 g/10 min. High melting is defined as a polymer having a melting point of between 130-165° C. It is not related to MFR.

As used herein, "nucleated" refers to a polymer that has been modified by addition of a nucleating agent such as Millad™, a dibenzyl sorbitol commercially available from Milliken. Other conventional nucleating agents may also be used.

Preparation of polypropylene (PP) also involves the use of Ziegler catalysts such as a titanium trichloride in combination with aluminum diethylmonochloride, as described by Cecchin, U.S. Pat. No. 4,177,160. Polymerization processes used to produce PP include the slurry process, which is run at about 50-90° C. and 0.5-1.5 MPa (5-15 atm), and both the gas-phase and liquid-monomer processes in which extra care must be given to the removal of amorphous polymer. Ethylene may be added to the reaction to form a polypropylene with ethylene blocks. PP resins may also be prepared by using any of a variety of metallocene, single site and constrained geometry catalysts together with their associated processes.

The peroxide is preferably an organic peroxide. Suitable organic peroxides have a half life of at least one hour at 120° C. Illustrative peroxides include a series of vulcanizing and polymerization agents that contain α,α'-bis(t-butylperoxy)-diisopropylbenzene and are available from Hercules, Inc. under the trade designation VULCUP™, a series of such agents that contain dicumyl peroxide and are available from Hercules, Inc. under the trade designation Di-cup™ as well as Luperox™ peroxides made by Elf Atochem, North America or Trigonox™ organic peroxides made by Akzo Nobel. The Lupersol™ peroxides include Lupersol™ 101 (2,5-dimethyl-2,5-di(t-butylperoxy)hexane), Lupersol™130 (2,5-dimethyl-2,5-di(t-butylperoxy)hexyne-3) and Lupersol™575 (2,5-t-amyl peroxy-2-ethylhexonate). Other suitable peroxides include 2,5-dimethyl-2,5-di-(t-butylperoxy) hexane, di-t-butylperoxide, di-(t-amyl)peroxide, 2,5-di(t-amyl peroxy)-2,5-dimethylhexane, 2,5-di-(t-butylperoxy)-2, 5-diphenylhexane, bis(alpha-methylbenzyl)peroxide, benzoyl peroxide, t-butyl perbenzoate, 3,6,9-triethyl-3,6,9-trimethyl-1,4,7-triperoxonane and bis(t-butylperoxy)-diisopropylbenzene.

The peroxide is suitably present in an amount that is about 0.075 wt % or less, more desirably about 0.050 wt % or less. Preferably the peroxide is present within a range of from about 0.005 to about 0.075 wt %. The range is more preferably from about 0.01 to about 0.05 wt % and most preferably from about 0.015 to about 0.025 wt %. All peroxide weights are based on the elastomeric EAO polymer(s) or polymer blend with the high melting polymer. The use of low peroxide concentrations will decrease the concentration of peroxide decomposition products, which are often associated with unpleasant odors, reduce odor problems in the final TPE composition.

The free radical coagent is a monomer or low molecular weight polymer having two or more functional groups with high response to free radicals. Typically, these functional groups are either methacrylate, allyl or vinyl. The free radical coagent enhances the rheology modification of the peroxide by two mechanisms. Firstly, by peroxide induced allylic hydrogen abstraction from the coagent, a lower energy state, longer lived free radical is created. This free radical can then induce branching in the ethylene elastomer by hydrogen abstraction. Due to the lower energy state of the free radical, β-scissioning and disproportionation of either the polypropylene or ethylene elastomer phase is less likely to occur. Secondly, the multifunctional coagent can act as a bridging group between the polymer chains.

Suitable free radical coagents for this application would include diallyl terephthalate, triallylcyanurate, triallylisocyanurate, 1,2 polybutadiene, divinyl benzene, trimethylolpropane trimethacrylate, polyethylene glycol dimethacrylate, ethylene glycol dimethacrylate, pentaerythritol triacrylate,allyl methacrylate, N N'-m-phenylene bismaleimide, toluene bismaleimide-p-quinone dioxime, nitrobenzene, diphenylguanidine. Preferred coagents are triallylcyanurate, 1,2 polybutadiene, divinyl benzene, and trimethyolpropane trimethacrylate.

The coagent is suitably present in an amount that is within the range of from about 0.025 to 1.0 wt %. The range is preferably from about 0.05 to about 0.5 wt %.

The peroxide to coagent ratio is suitably from 1:4 to 1:20. The optimum ratio of coagent is dependent on the ethylene/α-olefin:polypropylene ratio used in the compositions. A suitable range of EAO:PP on a weight percent basis is 60:40-90:10. The preferred range is 65:35-80:20 weight percent.

The peroxide and free radical coagent can be added by any conventional means. Illustrative procedures include imbibing it onto polymer pellets prior to compounding, adding it to polymer pellets as the pellets enter a compounding apparatus such as at the throat of an extruder, adding it to a polymer melt in a compounding apparatus such as a Haake, a Banbury mixer, a Farrel continuous mixer or a Buss kneader or injecting it into an extruder, at 100% active ingredients (i.e., neat) or optionally as a dispersion or solution in an oil, such as a processing oil, at a point where the extruder contents are molten. A preferred procedure is imbibing the peroxide and coagent into the polymer pellets prior to compounding.

In order to produce an extruded profile having a smooth surface and which can be extruded at high line speeds (e.g., up to 150 rpm on a Brabender single screw (¾ inch dia.) extruder) as well as having excellent collapse resistance, the TPE compositions of this invention need to have an STI that is between 15 and 30 and a tan delta at 190° C. between 1.05 and 1.40. If the peroxide levels are too high or the peroxide to coagent ratio to low, the extruded profiles have lumpy surfaces and cannot be extruded at reasonable line speeds.

STI, as used herein, is a ratio of polymer viscosity at a specified low shear rate (0.1 radians/second) divided by polymer viscosity at a specified high shear rate (100 radians/second) at a conventional STI test temperature of 190° C. Polymer viscosity is conveniently measured in poise (dyne-second/square centimeter (d-sec/cm 2)) at shear rates within a range of 0.1-100 radian per second (rad/sec) and at 190° C. under a nitrogen atmosphere using a dynamic mechanical spectrometer such as a RMS-800 or ARES from Rheometrics. STI essentially measures the flowability of the polymer under various shear conditions. Preferably, the STI of the TPE compositions of this invention is 15-30.

Tan delta is a particularly useful relationship for examining the processability of a polymer composition of this invention. Tan delta is also known as the dampening peak or the dissipation factor, which is defined as the ratio of the loss modulus to the storage modulus. Dampening is a very sensitive indicator of the molecular motions occurring in a material in both the solid state and the melt. The dampening peak relates to the increased freedom for small chain segment at the glass transition. Tan delta also exhibits a peak as materials go into the viscous flow region, where molecular entanglement effects become negligible and the only thing impeding flow is frictional forces. The tan delta value is a very good indicator to gauge the balance of melt strength to ability to flow as it is, in its definition, a ratio of the viscous component to the elastic component. As the tan delta goes up or is higher, the material is more fluid and as the tan delta is lower, the material is more elastic in nature. The tan delta values as a function of temperature at a given shear rate go through the viscous flow region and such values may indicate sensitivity of the polymer blend to temperature and shear rate in processing. Tan delta is well known to those skilled in the art defined and described in L. E. Nielson, Mechanical Properties of Polymers and Composites Volume 1, Marcel Dekker, Inc. pp. 139-150 (1974), incorporated herein by reference. Preferably, the tan delta @ 190° C. of the TPE compositions of this invention is between 1.05 to 1.40.

For this invention, tan delta was determined using a Rubber Processing Analyzer RPA-2000 from Alpha having a rotor-less biconical die design that contains two cone shaped 41.25 mm diameter dies having a die gap of 0.487 mm. Samples were tested at 15% strain and a frequency of 1.6 Hz over a temperature range starting at 50° C. and ending at 190° C. The tan delta at 190° C. is recorded. Accordingly, all references herein to tan delta values refer to tan delta at 190° C.

Collapse resistance is a visual determination of the ability of a profiled article to maintain its shape after exiting the extruder die. For example, when a tube exits a die it must maintain its original shape and not collapse or "sag".

In order to determine if insoluble gels are present in a polymer composition such as the rheology-modified compositions of this invention, soak the composition in a suitable solvent such as refluxing xylene for 12 hours as described in ASTM D 2765-90, method B. Any insoluble portion of the composition is then isolated, dried and weighed, making suitable corrections based upon knowledge of the composition. For example, the weight of non-polymeric components that are soluble in the solvent is subtracted from the initial weight and the weight of non-polymeric components that are insoluble in the solvent is subtracted from both the initial and final weight. The insoluble polymer recovered is reported as percent gel content. For purposes of this invention, "gel-free", "preclude formation of insoluble polymer gels" and "no measureable gels" all mean a gel content that is below detectable limits when using xylene as the solvent in ASTM D 2765-90, method B.

The compositions of this invention may be compounded with any one or more materials conventionally added to polymers. These materials include, for example, EAOs that have not been rheology modified, process oils, plasticizers, dispersants, specialty additives including stabilizers, fillers (both reinforcing and non-reinforcing), blowing agents, and pigments. These materials may be compounded with compositions of this invention either before or after such compositions are rheology modified. Skilled artisans can readily select any suitable combination of additives and additive amounts as well as timing of compounding without undue experimentation.

Process oils are often used to reduce any one or more of viscosity, hardness, modulus and cost of a composition. The most common process oils have particular ASTM (American Society for Testing and Materials) designations depending upon whether they are classified as paraffinic, naphthenic or aromatic oils. An artisan skilled in the processing of elastomers in general and the rheology-modified TPE compositions of this invention in particular will recognize which type of oil will be most beneficial. The process oils, when used, are desirably present in an amount within a range of from greater than 0, preferably from about 0.5 wt %, to about 50 wt %, based on total composition weight.

Fillers and reinforcing agents such as carbon black, glass, silica, metal carbonates such as calcium carbonate, metal sulfates such as calcium sulfate, talc, clay or graphite fibers; are typically used in TPE compositions. The fillers, when used, are desirably present in an amount within a range of from greater than 0 to 70 wt %, preferably from about 0.5 wt %, to about 40 wt %, based on total composition weight.

A variety of specialty additives may be advantageously used in compositions of this invention. The additives include antioxidants, surface tension modifiers, anti-block agents, lubricants, antimicrobial agents such as organometallics, isothtazolones, organosulfurs and mercaptans; antioxidants such as phenolics, secondary amines, phophites and thioesters; antistatic agents such as quaternary ammonium compounds, amines, and ethoxylated, propoxylated or glycerol compounds; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy,4-alkoxyenzophenone, a salicylate, a cynoacrylate, a nickel chelate and a benzylidene malonate and oxalanilide. A preferred hindered phenolic antioxidant is Irganox™ 1076 antioxidant, available from Ciba-Geigy Corp. Each of the above additives, if used, typically does not exceed 45 wt %, based on total composition weight, and are advantageously from about 0.001 to about 20 wt %, preferably from about 0.01 to about 15 wt % and more preferably from about 0.1 to about 10 wt %.

The rheology-modified TPE compositions of this invention may be fabricated into tubes, parts, sheets or other form using any one of a number of conventional procedures for processing TPEs. The compositions can also be formed, spun or drawn into films, fibers, multi-layer laminates or extruded sheets or profiles, or can be compounded with one or more organic or inorganic substances, on any machine suitable for such purposes. The compositions are particularly advantageous for high temperature TPE processes such as extrusion, calendaring, molding and blow molding operations.

The TPE compositions of this invention have surprisingly improved properties relative to blends of an EAO copolymer and a high melting polymer such as PP that have been subjected to rheology modification by peroxide only or peroxide and coagent in 1:2 to 2:1 ratios. Rheology modification by way of peroxide and free radical coagent in a specific ratio provides a combination of desirable and improved physical properties including a smoother surface at higher line speeds for extruded or caldendered parts, and improved shape retention.

For purposes of this invention, a 1:2 to 2:1 ratio includes a 1:2, 1:1, and a 2:1 ratio designated in whole numbers only.

The compositions of this invention can be formed into a variety of shaped articles using conventional polymer fabrication processes such as those identified above. A partial, far from exhaustive, listing of suitable shaped articles includes automobile body parts such as instrument panel skins, bumper fascia, body side moldings, exterior trim, interior trim, weather stripping, air dams, air ducts, and wheel covers, and non-automotive applications such as polymer films, polymer sheets, tubing, trash cans, storage containers, lawn furniture strips or webbing, lawn mower, garden hose, and other garden appliance parts, recreational vehicle parts, golf cart parts, utility cart parts and water craft parts. The compositions can also be used in roofing applications such as roofing membranes. The compositions can further be used in fabricating components of footwear such as a shaft for a boot, particularly an industrial work boot. A skilled artisan can readily augment this list without undue experimentation.

The following examples illustrate but do not, either explicitly or by implication, limit the present invention. Unless otherwise stated, all parts and percentages are by weight, on a total weight basis. Numeric ranges include the end points unless stated otherwise. Examples of the present invention are identified by Arabic numerals and comparative examples are represented by letters of the alphabet.

EXAMPLES AND COMPARATIVE EXAMPLE

Twelve compositions, seven representing this invention (Examples 1-7) and five being comparisons (Comparative Examples A-E), were prepared from the same EAO polymer using the following procedure. All twelve compositions were produced by tumble blending the peroxide and coagent together followed by tumble blending the peroxide/coagent mixture with EAO and PP pellets for 30 minutes to imbibe the peroxide/coagent mixture onto the pellets, then processing the imbibed pellets on a Werner Pfliederer ZSK-30 co-rotating twin screw extruder usng a K-tron loss-in-weight single screw feeder. The extrudate was cooled in a water bath and pelletized using a Conair pellitizer. Table 1 shows the extruder conditions. The pellets were again passed through the same extruder using the same screw conditions and temperature profile as in Table 1 where process oil (plasticizer) was injected into the second extruder zone. Process aid 0.35 wt % (Amfine AX-71, Amfine Chemical Corporation) and antioxidant 0.3 wt % (Irganox B 225) based on total wt of the TPE composition were combined together and using a K-Tron twin-screw loss-in-weight micro feeder were fed into the extruder at the feed throat.

TABLE 1

| Extruder Zone Temperatures (° C.) | |
|---|---|
| Zone | Temperature |
| 1 | 200 |
| 2 | 220 |
| 3 | 220 |
| 4 | 220 |
| 5 | 220 |
| 6 | 200 |

In examples 1-5 and Comparative Examples A and B, the extruded and pelletized mixture was then extruded into tubing using a Brabender single screw (¾ inch dia.) extruder having a L/D of 15/1. The extruded tubing had a 11.1 mm ID, 0.5 mm wall thickness, and the extruded tube was air cooled on a conveyor. 5-psig air was applied to the inner tube to facilitate cooling from the inside. Screw speeds were varied between 50-150 rpm, at 25 rpm increments. The zone temperatures were: 170° C. feed, 180° C. mid, 190° C. third zone (die), and the melt temperature of the polymer was between 193-197° C.

In the Examples 6 and 7 and Comparative Examples C-E, the compounded pellets were extruded into a rod using a 50 mm 20/1 L/D Davis Standard single screw extruder, fitted with a 5 mm diameter rod die. The extrudate was fed onto a Steward-Bolling four roll inverted-L 46 cm wide calender with fixed 1:1 roll friction ratios. The extrusion and calendering conditions are shown in Table II.

TABLE II

Process Conditions For Extrusion and Calendering of Exs. 6-7 and Comp. Exs. C-E

|  | Roll 1 | Roll 2 | Roll 3 | Roll 4 |
|---|---|---|---|---|
| Calendering Temp., °C. | 129 | 114 | 93 | 64 |

|  | Zone 1 | Zone 2 | Zone 3 | Die |
|---|---|---|---|---|
| Extrusion Temp., °C. | 120 | 150 | 180 | 180 |
| Stock Temp. °C. | 179 | | | |
| Extruder RPM | 30 | | | |
| Feed Rate kg/hr | 17.7 | | | |

The EAO polymer used in the Examples and Comparative Examples was an ethylene/1-octene copolymer having an $I_2$ of 0.5 g/10 min and a nominal density of 0.863 g/cc (Engage® 8180 polyolefin elastomer from DuPont Dow Elastomers L.L.C.). The polypropylene (PP) used in the examples was a polypropylene homopolymer having a melt flow of 12 (Inspire PPH 700-12 available from The Dow Chemical Company).

The peroxide used in the Examples and Comparative Example B was 2,5-dimethyl-2,5-di(t-butylperoxy)hexane (Lupersol 101 from Elf Atochem).

The free radical coagent used in the Examples and Comparative Examples was triallyl cyanurate (TAC from Cytec Industries, Inc.). Comparative Example B used trimethylolpropane trimethacrylate (100% SR-350 from Sartomer Company,Inc).

Surface appearance is a visual determination using the unaided eye. Surface appearances classified as "lumpy" are easily recognizable by the unaided eye as having noticeable ridges and valleys and feel rough to the touch. Surface appearances classified as "smooth" do not have detectable ridges and valleys using the unaided eye and feel smooth to the touch. Screw speed listed in the tables is the maximum speed (in 25 rpm increments) at which the profile exhibits a smooth surface appearance. Initial or slowest screw speed was 50 rpm and Comparative Example B had poor surface appearance at this speed.

Comparative Example A was a blend of EAO and PP which was not rheology modified. Comp. Exs. B-E were prepared using the same process described for the preparation of Example 1-8 in WO 02/24803 and at the listed peroxide:coagent ratio.

Table III summarizes data for the compositions of Examples 1-7 and Comparative Examples A-E. Table III specifies the wt % of the EAO polymer (EAO), the polypropylene (PP), the process oil, the peroxide (POX). and the free radical coagent (FRC) ingredients, and the peroxide:coagent ratio.

TABLE III

| Example/ Comp. Ex. | EAO | PP | Process Oil | POX | FRC | Peroxide: coagent ratio |
|---|---|---|---|---|---|---|
| 1 | 68 | 26 | 6 | 0.025 | 0.25 | 1:10 |
| 2 | 80 | 20 | 0 | 0.025 | 0.25 | 1:10 |
| 3 | 60 | 40 | 0 | 0.025 | 0.25 | 1:10 |
| 4 | 60 | 30 | 10 | 0.025 | 0.25 | 1:10 |

TABLE III-continued

| Example/ Comp. Ex. | EAO | PP | Process Oil | POX | FRC | Peroxide: coagent ratio |
|---|---|---|---|---|---|---|
| 5 | 70 | 20 | 10 | 0.025 | 0.25 | 1:10 |
| 6 | 60 | 37 | 3 | 0.05 | 0.24 | 1:5 |
| 7 | 63 | 37 | 0 | 0.05 | 0.2 | 1:4 |
| A | 68 | 26 | 6 | 0 | 0 | — |
| B | 69.85 | 29.85 | 0 | 0.15 | 0.15 | 1:1 |
| C | 63 | 37 | 0 | 0.2 | 0.2 | 1:1 |
| D | 63 | 37 | 0 | 0.125 | 0.2 | 1:1.6 |
| E | 63 | 37 | 0 | 0.2 | 0.05 | 4:1 |

The properties of the compositions of the Examples and Comparative Examples were determined and are reported in Table IV below. Gel content of the composition was measured by extracting with refluxing xylene for 12 hours as described in ASTM D 2765-90. Gel content of the calendered examples was determined by visual inspection.

TABLE IV

| Example | STI | Tan delta @ 190° C. | Extrusion speed, rpm | Surface Appearance | Collapse Resistance | Gel (wt %) |
|---|---|---|---|---|---|---|
| 1 | 18.6 | 1.275 | 125 | Smooth | Good | N/D |
| 2 | 26.9 | 1.111 | 150 | Smooth | Good | N/D |
| 3 | 24.4 | 1.318 | 150 | Smooth | Good | N/D |
| 4 | 18.7 | 1.351 | 125 | Smooth | Good | N/D |
| 5 | 19.9 | 1.212 | 125 | Smooth | Good | N/D |
| 6 | 23 | 1.36 | N/A | Smooth | N/A | NO* |
| 7 | 27 | 1.05 | N/A | Smooth | N/A | NO* |
| A | 9.8 | 1.59 | 50 | Smooth | Poor | N/D |
| B | 53.8 | 0.92 | 50 | Rough | Good | 1% |
| C | 69 | 0.72 | N/A | Rough | N/A | NO* |
| D | 67 | 0.80 | N/A | Rough | N/A | NO* |
| E | 45 | 0.88 | N/A | Smooth | N/A | NO* |

N/D indicates the gel level is below detectable limits
N/A - Ex. 6-8 and Comp. Ex. C-E were not extruded but were calendered sheets
*gel levels determined by visual inspection The data presented in Table IV illustrate several points. First Examples 1 to 5 can be extruded at high extrusion speeds and give profiles having a smooth surface and good collapse resistance relative to Comparative Examples A and B. If either the tan delta or STI are too high or too low the extruded profile has either a poor surface appearance or insufficient collapse resistance. Examples 6 and 7 show that compositions of the invention also yield smooth sheets with no visual gels when calendered. Comparative Examples C and D yielded rough sheets when calendered. Comparative Example E was capable of yielding a smooth calendered sheet, however, the STI and Tan delta are outside the claimed range, indicating this composition will not perform as well when extruded. Similar results are expected with other EAO polymers, propylene polymers, and rheology modifiers or modification processes, all of which are disclosed above.

What is claimed is:

1. A rheology-modified, gel-free thermoplastic elastomer composition comprising from 60 to 90 weight percent, based on the weight of the composition, of at least one elastomeric ethylene/alpha-olefin polymer or ethylene/alpha-olefin polymer blend, and from 10 to 40 weight percent, based on the weight of the composition, of at least one high melting polymer selected from the group consisting of polypropylene homopolymers and propylene/ethylene copolymers, and wherein the rheology modification is induced by a combination comprising 0.075 weight percent or less peroxide, and a free radical coagent, and wherein the peroxide:coagent ratio is from 1:4 to 1:20, and the rheology-modified, gel-free thermoplastic elastomer composition has an STI of 15-30, a tan delta at 190° C. of 1.05-1.40, and a gel content that is below detectable limits when using xylene as the solvent in ASTM D 2765-90, method B; and wherein the amount of peroxide is based on the weight of the high melting polymer and the weight of either the elastomeric polymer of the elastomeric polymer blend.

2. The composition of claim 1, wherein the peroxide concentration is 0.050 weight percent or less.

3. The composition of claim 1, wherein the peroxide is an organic peroxide.

4. The composition of claim 1, wherein the organic peroxide is selected from the group consisting of α,α'-bis(t-butylperoxy)-diisopropylbenzene; dicumyl peroxide; di-(t-amyl)peroxide; 2,5-dimethyl-2,5-di(t-butylperoxy)hexyne-3; 2,5 (t-amyl peroxy-2-ethylhexonate); 2,5-dimethyl-2,5-di-(t-butyl peroxy)hexane; di-t-butylperoxide; 2,5-di(t-amyl peroxy)-2,5-dimethyihexane; 2,5-di-(t-butylperoxy)-2,5-diphenylhexane; bis(alpha-methylbenzyl)peroxide; t-butyl perbenzoate; benzoyl peroxide; 3,6,9-triethyl-3,6,9-trimethyl-1,4,7-triperoxonane; and bis(t-butylperoxy)-diisopropylbenzene.

5. The composition of claim 1, wherein the free radical coagent is selected from the group consisting of diallyl terephthalate; triallylcyanurate; triallylisocyanurate; 1,2-polybutadiene; divinyl benzene; trimethylolpropane trimethacrylate; polyethylene glycol dimethacrylate; ethylene glycol dimethacrylate; pentaerythritol triacrylate; allyl methacrylate; N,N'-m-phenylene bismaleimide; toluene bismaleimide-p-quinone dioxime; nitrobenzene; and diphenylguanidine.

6. The composition of claim 5, wherein the free radical coagent is selected from the group consisting of triallylcyanurate; 1,2-polybutadiene; divinyl benzene; and trimethylolpropane trimethacrylate.

7. The composition of claim 1, wherein the ethylene/α-olefin polymer has polymerized therein at least one α-olefin comonomer, the α-olefin containing from 3 to 20 carbon atoms.

8. The composition of claim 7, wherein the α-olefin contains from 3 to 10 carbon atoms.

9. The composition of claim 1, wherein the ethylene/α-olefin polymer is a diene-modified polymer, the diene being selected from the group consisting of norbornadiene, dicyclopentadiene, 1,4-hexadiene, piperylene, 5-ethylidene-2-norbornene and mixtures thereof.

10. The composition of claim 1, wherein the high melting polymer is a nucleated polymer.

11. The composition of claim 1, further comprising a process oil, in an amount within a range of from greater than 0 to about 50 weight percent, based on total composition weight.

12. The composition of claim 1 or claim 11, further comprising a filler, in an amount within a range of from about 0 to about 70 weight percent, based on total composition weight.

13. A process for preparing a rheology-modified, gel-free TPE composition, the process comprising: a) adding at least one peroxide and at least one free radical coagent, in a peroxide:coagent ratio of 1:4 to 1:20, and a maximum peroxide concentration of 0.075 weight percent, to a molten polymer blend that comprises from 60 to 90 weight percent, based on the weight of the composition, of an elastomeric ethylene/alpha-olefin polymer, and from 10 to 40 weight percent, based on the weight of the composition, of a high melting polymer, selected from the group consisting of polypropylene homopolymers and propylene/ethylene copolymers; and b) maintaining the polymer blend in a molten state, while subjecting it to conditions of shear, sufficient to disperse the peroxide and coagent throughout the molten polymer blend, effect rheology modification of the polymers, and preclude formation of insoluble polymer gels (determined using xylene as the solvent in ASTM D 2765-90, method B), and wherein sufficient rheology modification is measured by an STI of 15-30 and a tan delta of 1.05-1.40; and wherein the amount of peroxide is based on the weight of the high melting polymer and weight of the elastomeric polymer.

14. A process for preparing a rheology-modified, gel-free TPE composition, the process comprising: a) adding at least one peroxide and at least one free radical coagent, in a peroxide:coagent ratio of 1:4 to 1:20, and a maximum peroxide concentration of 0.075 weight percent to at least one component of a polymer blend, before the components are blended, the component polymers comprising an elastomeric ethylene/alpha-olefin polymer and a high melting polymer, selected from the group consisting of polypropylene homopolymers and propylene/ethylene copolymers; b) blending the component polymers; and c) converting the polymer blend to a molten polymer blend, while subjecting the blend to conditions of shear, sufficient to disperse the peroxide and coagent throughout the molten polymer blend, effect rheology modification of the polymers, and preclude formation of insoluble polymer gels (determined using xylene as the solvent in ASTM D 2765-90, method B), and wherein sufficient rheology modification is measured by an STI of 15-30 and a tan delta of 1.05-1.40; and wherein the amount of peroxide is based on the weight of the high melting polymer and the weight of the elastomeric polymer.

15. A process for preparing a rheology-modified, gel-free thermoplastic elastomer article of manufacture, the process comprising: a) adding at least one peroxide and at least one free radical coagent, in a peroxide:coagent ratio of 1:4 to 1:20, and a maximum peroxide concentration of 0.075 weight percent, to a molten elastomeric ethylene/alpha-olefin polymer or elastomeric ethylene/alpha-olefin polymer blend, to provide a rheology-modified ethylene/alpha-olefin polymer or ethylene/alpha-olefin polymer blend; b) adding to the rheology-modified polymer, or polymer blend, a high melting polymer, selected from the group consisting of polypropylene homopolymers and propylene/ethylene copolymers, to form a composite polymer blend; and c) converting the composite polymer blend into the article of manufacture, the article of manufacture having a smooth surface appearance and a gel content that is below detectable limits when using xylene as the solvent in ASTM D 2765-90, method B; and wherein the amount of peroxide is based on the weight of the high melting polymer and the weight of either the elastomeric polymer of the elastomeric polymer blend.

16. An article of manufacture having at least one component thereof fabricated from the composition of claim 1.

17. The article of claim 16, wherein the composition further comprises at least one additive selected from the group consisting of process oils and fillers.

18. The article of claim 17, wherein the process oil is present in an amount within a range of from greater than 0 to about 50 percent by weight, based on total composition weight.

19. The article of claim 17, wherein the filler is selected from the group consisting of glass, silica, carbon black, metal carbonates, metal sulfates, talc, clay and graphite fibers.

20. The article of claim 17, wherein the filler is present in an amount within a range of from greater than 0 to about 70 percent by weight, based on total composition weight.

21. The composition of claim 1, wherein the peroxide to coagent ratio is from 1:10 to 1:20.

22. The article of claim 16, wherein the article is an extruded profile.

23. The article of claim 16, wherein the article is an injected molded article.

24. The article of claim 16, wherein the article is a blow molded article.

25. The article of claim 16, wherein the article is a calendared article formed from a high product line speed process.

26. The article of claim 16, wherein the article is an automobile body part.

27. The article of claim 16, wherein the article is a polymer film or polymer sheet.

28. The article of claim 16, wherein the article is a recreational vehicle part.

29. The article of claim 16, wherein the article is a roofing membrane.

30. The article of claim 16, wherein the article is a footwear component.

* * * * *